United States Patent Office 3,419,430
Patented Dec. 31, 1968

3,419,430
ELECTRICAL ENERGY DEVICE CONTAINING POLYELECTROLYTE GEL SEPARATOR
Alan S. Michaels, Lexington, Mass., assignor to Amicon Corporation, Cambridge, Mass., a corporation of Massachusetts
No Drawing. Continuation-in-part of application Ser. No. 340,499, Jan. 27, 1964. This application Sept. 26, 1966, Ser. No. 581,721
The portion of the term of the patent subsequent to June 6, 1984, has been disclaimed
10 Claims. (Cl. 136—26)

ABSTRACT OF THE DISCLOSURE

Electrical energy producing device having opposed electrodes, between and in contact with which is a solid mass of aqueous electrolyte and a gel made from two ionically associated polymers, one having anionic groups attached to a polymeric structure, the other having cationic groups attached to a polymeric structure, the aqueous electrolyte within the solid mass being the sole water and electrolyte present in the device.

---

This application is a continuation-in-part of copending application Ser. No. 340,499 filed Jan. 27, 1964, now Patent No. 3,324,068.

This invention relates to novel electrical energy producing devices such as storage batteries and fuel cells containing aqueous electrolyte in solid form. Lead sulfuric acid storage batteries embodying the sulfuric acid in solid form are of particular importance.

Batteries and fuel cells of the type to which the present invention applies are those containing one or more individual cells, each containing at least one cathode, at least one opposing anode, and an aqueous liquid electrolyte in contact therewith. While in some cases the aqueous electrolyte may be alkaline, e.g., in a silver-zinc battery or in a hydrogen-oxygen fuel cell, the batteries and fuel cells with which the present invention are particularly useful are those containing acidic electrolytes, e.g., lead sulfuric acid storage batteries.

The presence of free liquid aqueous electrolyte in conventional devices such as batteries and fuel cells offers the disadvantage that the devices must be used and maintained in upright position to prevent spillage. By means of the present invention all of the aqueous liquid electrolyte conventionally employed is solidified and maintained in solid gel form, so that the device may be stored or used in inverted position without risk of spillage or leakage.

The electrolyte of the present invention may be identical with conventional electrolytes with regard to the nature of the dissolved electrolyte and the relative proportions of water and electrolyte. It is rendered solid by including it in a solid gel mass of ionically cross-linked polycationic and polyanionic polymers, which may be formed as described in the copending application of Michaels and Miekka Ser. No. 341,834 filed Jan. 24, 1964 and in U.S. Patent No. 3,271,496 issued Sept. 6, 1966.

In the case of some electrolytes, for example aqueous sulfuric acid, the aqueous electrolyte of the desired concentration may be introduced into the gel mass during formation of the gel. It is also possible in some cases to imbibe the desired aqueous electrolyte into the dry preformed solid gel mass, or to equilibrate with the desired aqueous electrolyte a preformed solid gel mass containing water or a mixture of water and electrolyte of undesired concentration or content, or one containing in addition a volatile organic solvent.

The solid gel mass containing the desired aqueous electrolyte in the desired quantity and concentration may be provided in the desired geometric shape and size to fit between the electrodes of a conventional battery or fuel cell and may be assembled with the electrodes during manufacture of the battery or fuel cell, or the solid gel mass containing the electrolyte may be formed in situ between the previously assembled electrodes of a conventional device. In the case of a lead sulfuric acid storage battery the electrodes may be formed and dry charged before introduction of the solid gel mass between them, or they may be formed or activated after introduction of the solid gel mass, in which case the concentration of the acid will need to be changed, for best results, after the activation step by equilibrating with more concentrated acid.

The present invention makes it unnecessary to employ separators between the electrodes since the solid gel mass containing the electrolyte is resistant to growth of dendrites between electrodes. The solid gel mass containing aqueous electrolyte displays remarkably high electrical conductivity; in the case of aqueous sulfuric acid the conductivity is very nearly the same as that of aqueous sulfuric acid alone, so that power loss ($I^2R$ loss) in the battery is minimized. In addition, the solid gel mass containing the aqueous electrolyte displays resilient, rubbery properties, thus serving to cushion and support fragile electrodes.

The polyelectrolytes useful in the present invention are organic polymers having dissociable ionic groups which impart electrolytic characteristics in forming salts and acids (in the case of anionic polyelectrolytes) and bases (in the case of cationic polyelectrolytes). Typical of these are the polymers of sodium styrene sulfonate and of vinyl benzyl trimethyl ammonium chloride, and other materials of the same general type having a synthetic organic polymeric structure, which, without the ionic groups (sulfonate or quaternary ammonium), would be a water insoluble film forming material. They are accordingly characterized by a sufficiently high molecular weight to be solid and capable of film formation (typically greater than 50,000) while having sufficient dissociable ionic groups chemically bonded to the polymeric structure to be water soluble. As a very general rule there should be at least one ionic group for every six repeating monomer (mer) units, or for each average chain interval of 12 carbon atoms.

Thus, in addition to the preferred polymers of sodium styrene sulfonate and vinyl benzyl trimethyl ammonium chloride, copolymers of these materials with other vinyl compounds in molar ratios of 1:6 or less may be employed, as well as other well known polyelectrolytes of the same general type, such as polyacrylic acid, hydrolyzed copolymers of styrene and maleic anhydride, polyvinyl sulfonic acid, sulfonated polystyrene, sulfonated polyvinyl toluene, alkali metal salts of the foregoing acidic polymers, polyethyleneimine, polyvinyl pyridine, and polydimethylaminoethyl methacrylate, quaternized polyethyleneimine, quaternized poly (dimethylaminoethyl) methacrylate, polyvinyl methyl pyridinium chloride, and the like. Of the polymers containing anionic groups, those containing sulfonate groups are preferred, while cationic polymers containing quaternary ammonium groups are preferred.

The solid gel mass may be formed by dissolving the polyanionic polyelectrolyte and polycationic polyelectrolyte separately in an aqueous medium containing a strong, shielding electrolyte such as sodium bromide or sulfuric acid; or by dissolving preformed solid finely-divided ionically cross-linked polyanionic-polycationic polyelectrolytes. The dissolution is aided either by the addition of a water miscible low polarity organic liquid having a volatility at least as great as that of water, e.g. a volatile water-miscible organic solvent, or preferably by heating the aqueous electrolyte solution to an elevated temperature.

The solution is then caused to gel in a suitable mold by reducing the activity of the electrolyte in solution, for example by evaporating the volatile solvent or by cooling the heated solution. The solid gel mass thus produced, which may be of any desired size and shape, may be washed with water to leach out the residue of electrolyte used to form the solution and also the residue of any volatile organic solvent used. However, if the electrolyte used in forming the solution is the same, e.g. sulfuric acid, as the electrolyte desired in the battery or fuel cell, and of the desired concentration, and if no objectionable organic solvent has been used in preparing the casting solution, the solidified gel may be used without further treatment. The gel sheet in this form may also be subjected to forming or shaping under pressure if desired, as by press forming or extrusion.

The relative proportions of the two polyelectrolyte polymers containing anionic and cationic groups respectively which are used in making the solid gel mass of the present invention may vary over a substantial range, from 10:1 to 1:10 by equivalent weight, preferably from 4:1 to 1:4 by equivalent weight.

The solid gel mass of the present invention may include, if desired, reinforcing or supporting elements such as fibers or filaments, woven or unwoven, of glass, polyethylene, polypropylene, or other material inert to the electrolyte and electrodes. The use of a thin layer of such non-woven fabric on the surface of the gel mass facilitates handling and assembling of the mass with the electrodes. However, such reinforcing or supporting elements are not required for satisfactory performance of the batteries or fuel cells of the present invention.

The following specific examples are intended to illustrate the present invention without serving as a limitation upon its scope.

EXAMPLE I

A solid finely-divided ionically cross-lined polyanionic-polycationic polymer complex was prepared by dissolving approximately 100 parts by weight of dry powdered poly (sodium styrene sulfonate) together wth 333 parts by weight of an aqueous solution containing 30% by weight of poly (vinyl benzyl trimethyl ammonium chloride) in a solution consisting of 266 parts by weight of calcium nitrate tetrahydrate, 266 parts of 1,4-dioxane, and 33 parts of water, and diluting the resultant viscous syrup with cold tap water to precipitate a slurry which was then filtered, washed, dried, and ground to pass a 20 mesh sieve. The sole cross-links present in the solid resin complex were ionic cross-links.

A mixture was prepared containing 150 grams of sulfuric acid and 30 grams of distilled water. There were stirred into this mixture 30 grams of the finely-divided solid cross-linked resin complex described in the preceding paragraph. Then, 90 grams of methanol and approximately 5 drops of a fluorinated surface active agent (3M FC-170) were added. The surface active agent was employed to improve the flow and levelling properties of the solution; this mixture was placed in a tightly sealed jar and left on a roll mill for 24 hours. A viscous solution was formed which was subjected to centrifugation for five minutes.

One side of an 8" x 9" x ⅛" glass plate was covered with 2 mil polytetrafluoroethylene (Teflon) film and subsequently with polypropylene non-woven fabric (1.4 mils). The Teflon and polypropylene were held in place with ordinary masking tape along their margins. Care had to be taken to avoid surface wrinkles.

A 25 mil drawdown was made using the supernatant centrifuged solution on the covered plate with an adjustable, stainless steel drawdown bar. The drawdown was placed in an air circulation oven for one-half hour at 55° C. and subsequently heated in a vacuum oven at a pressure of 28 inches of mercury for two hours at 85° C., then cooled in a desiccator. A second drawdown was made over the first, this time with a clearance of 37½ mils, and the drying cycle described above was repeated. The drawdown plus drying cycle procedure was repeated twice again at drawdown bar clearances of 50 and 62.5 mils respectively.

After the last drawdown, the material was allowed to cool slowly in the vacuum oven over a period of about six hours with the vacuum of 28" being maintained.

After cooling, the gel was removed from the plate with a razor blade. The polypropylene non-woven fabric adhered firmly to the gel and served as a support, while the assemblage was readily released from the Teflon casting surface. Two such assemblages—each having a thickness of about 30 mils—were laminated together in a press at room temperature. Thickness was held to 52 mils by shims. After pressing, the assemblage was cut to form squares two inches by two inches in size. Two of these squares of solid gel mass were then equilibrated with sulfuric acid having a specific gravity of 1.260 which is conventional battery acid.

A three-plate cell (two negative plates and one positive, each two inches square) was constructed from conventional pasted and dry charged lead plates of the type used in conventional lead sulfuric acid batteries, and the plates were immersed in conventional battery acid and drained. The two squares of solid gel mass were then inserted on opposite sides of the positive electrode or plate in the plate assembly, between the positive and negative plates. The entire assembly, which contained no appreciable quantity of free liquid sulfuric acid apart from the electrolyte contained in the solid gel mass and in the lead plates, was then inserted in a tight fitting cell so that the plates were pressed firmly against the solid gel masses.

The cell withstood 18 cycles of charging and discharging without failure. The cell capacity increased from an initially rather low value to approximately one ampere hour (at a rate of 0.5 ampere) after five cycles.

Similar results may be obtained using other organic solvents, such as tetrahydrofuran, during the preparation of the solid gel mass, or by omitting the organic solvent as in the procedure described in the following example.

EXAMPLE 2

The solid finely-divided ionically cross-linked resin of Example 1 was ground further to pass a 200 mesh screen. Approximately 70 parts by weight of this material was stirred slowly, over a period of about 15 minutes into 700 parts of 50% by weight aqueous sulfuric acid chilled with Dry Ice. The slurry was then stirred further at room temperature and allowed to stand.

An 8" x 9" x ⅛" glass plate was covered with 2-mil Teflon film, which was held on by masking tape along its margins. A layer of 1.4 mil non-woven polypropylene fabric was taped over this. A second glass plate, of the same outside dimensions, but with a 6¼" x 6¼" square hole cut in the middle was taped on top of the first plate. This formed an "open mold," 6¼" x 6¼" x ⅛".

Approximately 110 grams of slurry was patted into the containing mold. The mold was then placed in a vacuum oven which was heated to 85° C. at 28 inches of mercury pressure. After 5 hours, the mold was removed from the oven and cooled to room temperature in a dessicator. The slurry had coalesced into a coherent tacky rubbery gel, which was cut from the mold with a razor blade. A sheet of polypropylene non-woven fabric was placed on the exposed side of the solid gel mass. The polypropylene non-woven fabric taped onto the plate had adhered to the bottom side of the gel but the gel released easily from the Teflon sheet. The gel, which has a thickness of 65 mils, had an acid content of 1.05 grams per square inch.

A portion of the gel was pressed to 52 mils gauge in a hydraulic press at 60° C. The gel mass contained 86% by weight of 66% aqueous sulfuric acid electrolyte.

A conventional fuel cell fixture was provided containing ports for the introduction of streams of hydrogen and air and spent gas vents. The solid gel mass described above was cut to the size and shape required and was fitted into the fixture between conventional Englehard electrodes each three inches square with 5 mg./cm.$^2$ of platinum as the active catalyst material. The electrodes were pressed into firm contact with the solid gel mass during assembly. No free liquid aqueous electrolyte was present beyond that contained in the solid gel mass. The temperature of the cell was controlled by conventional means at 50° C., and the flow rates of air and of hydrogen into the cell were adjusted to 2.0 cubic feet per hour and 0.05 cubic feet per hour respectively. The power output from the electrodes at varying voltages was measured and was found to amount to 12 to 56 watts per square foot of electrode area at 0.72 and 0.39 volt respectively, and the open cell voltage was determined to be approximately 0.9 volt.

EXAMPLE 3

A solid gel mass was prepared as described in Example 2 having a thickness of approximately 90 mils in which the weight ratio of acid to ionically cross-linked polyelectrolyte polymers was approximately 2 to 1. The mass was equilibrated in 50% aqueous sulfuric acid overnight at room temperature and sponged dry. Two lead plates (2 inches x 2⅜ inches x 30 mils) were formed by the Plante process to provide lead oxide, and one of them was reduced to metallic lead to form a negative electrode. The mass, after equilibration, was placed between and in contact with the two plates, trimmed to correspond with them in size, and the entire assembly was bolted between Lucite plates to form a cell which contained no free liquid electrolyte in addition to the sulfuric acid contained in the gel mass. The cell was subjected to rapid automatic charge-discharge cycles, being charged 87 seconds at a constant voltage of 2.4 volts and discharged 13 seconds at 1.5 amperes and about 2 volts during each cycle. The cell was still functioning after the cycling had been continued for 20 hours.

Similar results may be obtained when the weight ratio of sulfuric acid to ionically cross-linked polyelectrolyte polymers in the solid gel mass varies from 0.5:1 to 15:1 and when the concentration of the sulfuric acid in the aqueous acid solution varies from about 15% to about 80% by weight. The fuel cell containing the aqueous electrolyte in solid gel form may also be operated effectively from room temperature to about 95° C.

Other batteries and fuel cells may be constructed comprising conventional electrodes and conventional aqueous electrolytes contained in solid gel masses and containing no additional free liquid aqueous electrolyte, particularly good results being obtained in the case of acidic electrolytes.

Although specific embodiments have been described herein, it is not intended to limit the invention solely thereto but to include all of the obvious variations and modifications within the spirit and scope of the appended claims.

What is claimed is:

1. An electrical energy producing device comprising a plurality of opposed electrodes and disposed between and in contact with a pair of said electrodes a solid mass consisting essentially of aqueous electrolyte and a continuous gel structure having a lattice in which the sole reactants are two ionically associated synthetic organic polymers, one of said polymers having dissociable anionic groups attached to a polymeric structure which without the said anionic groups forms a water insoluble film forming resin, and the other of said polymers having dissociable cationic groups attached to a polymeric structure which without said cationic groups forms a water insoluble film forming resin, each of said polymers having sufficient dissociable groups to render it water soluble in the absence of the other, said aqueous electrolyte within said mass being the sole water and electrolyte present in said device.

2. A device as claimed in claim 1 in which said anionic groups are sulfonate groups, said cationic groups are quaternary ammonium groups, and said polymers are bonded together solely by said ionic association.

3. A device as claimed in claim 2 in which the device is a lead-sulfuric acid storage battery and the electrolyte is sulfuric acid.

4. A device as claimed in claim 3 in which one of the polymers is of a styrene sulfonate and the other polymer is of vinyl benzyl quaternary ammonium compound.

5. A device as claimed in claim 2 in which the electrolyte is acidic.

6. A device as claimed in claim 5 in which the device is a hydrogen-oxygen fuel cell and the electrolyte is sulfuric acid.

7. In a lead sulfuric acid battery having a plurality of electrodes, a solid mass disposed between and in contact with a pair of said electrodes consisting essentially of aqueous sulfuric acid and a continuous gel structure having a lattice in which the sole reactants are two ionically associated synthetic organic polymers, one of said polymers having dissociable anionic groups attached to a polymeric structure which without the said anionic groups forms a water insoluble film forming resin, and the other of said polymers having dissociable cationic groups attached to a polymeric structure which without said cationic groups forms a water insoluble film forming resin, each of said polymers having sufficient dissociable groups to render it water soluble in the absence of the other, said mass containing within itself all of the water and sulfuric acid present in said battery.

8. A battery as claimed in claim 7 in which said anionic groups are sulfonate and said cationic groups are quaternary ammonium.

9. In a hydrogen-oxygen sulfuric acid fuel cell having a plurality of electrodes, a solid mass disposed between and in contact with a pair of said electrodes consisting essentially of aqueous sulfuric acid and a continuous gel structure having a lattice in which the sole reactants are two ionically associated synthetic organic polymers, one of said polymers having dissociable anionic groups attached to a polymeric structure which without the said anionic groups forms a water insoluble film forming resin, and the other of said polymers having dissociable cationic groups attached to a polymeric structure which without said cationic groups forms a water insoluble film forming resin, each of said polymers having sufficient dissociable groups to render it water soluble in the absence of the other, said mass containing within itself all of the water and sulfuric acid present in said fuel cell.

10. A fuel cell as claimed in claim 9 in which said anionic groups are sulfonate and said cationic groups are quaternary ammonium.

References Cited

UNITED STATES PATENTS

| | | | |
|---|---|---|---|
| 3,232,916 | 2/1966 | Fogle | 136—146 XR |
| 3,240,723 | 3/1966 | Friedlander | 136—146 XR |
| 3,275,575 | 9/1966 | Fogle | 136—153 XR |
| 3,284,238 | 11/1966 | White | 136—153 XR |
| 3,297,484 | 1/1967 | Niedrach | 136—86 |
| 3,324,068 | 6/1967 | Michaels | 136—146 XR |

WINSTON A. DOUGLAS, *Primary Examiner.*

D. L. WALTON, *Assistant Examiner.*

U.S. Cl. X.R.

136—86, 146, 157